US011252570B2

(12) United States Patent
Richardson

(10) Patent No.: US 11,252,570 B2
(45) Date of Patent: Feb. 15, 2022

(54) COMPUTER SYSTEM AND METHOD FOR SOFTWARE AUTHENTICATION AND SINGLE APPLICATION ENFORCEMENT

(71) Applicant: John Junior Richardson, Jacksonville, IL (US)

(72) Inventor: John Junior Richardson, Jacksonville, IL (US)

(*) Notice: Subject to any disclaimer, the term of this patent is extended or adjusted under 35 U.S.C. 154(b) by 0 days.

(21) Appl. No.: 16/952,934

(22) Filed: Nov. 19, 2020

(65) Prior Publication Data

US 2021/0160689 A1    May 27, 2021

Related U.S. Application Data

(60) Provisional application No. 62/939,282, filed on Nov. 22, 2019.

(51) Int. Cl.
*H04W 12/06* (2021.01)
*H04W 12/30* (2021.01)
*H04W 76/11* (2018.01)
*H04W 12/71* (2021.01)

(52) U.S. Cl.
CPC ........... *H04W 12/35* (2021.01); *H04W 12/06* (2013.01); *H04W 12/71* (2021.01); *H04W 76/11* (2018.02)

(58) Field of Classification Search
CPC ...... H04W 12/35; H04W 12/06; H04W 76/11
See application file for complete search history.

(56) References Cited

U.S. PATENT DOCUMENTS

| | | | |
|---|---|---|---|
| 7,313,828 B2 | 12/2007 | Holopainen | |
| 8,549,586 B2 | 10/2013 | Mendel | |
| 8,560,453 B2 | 10/2013 | Pendakur | |
| 8,620,818 B2 | 12/2013 | Hughes | |
| 8,984,293 B2 | 3/2015 | Layson | |
| 9,836,730 B1 | 12/2017 | Metrailler | |
| 9,917,821 B2 | 3/2018 | Gillmore | |
| 9,965,816 B2 | 5/2018 | Langman | |
| 2004/0225894 A1 | 11/2004 | Colvin | |
| 2005/0204405 A1 | 9/2005 | Wormington | |
| 2006/0064488 A1 | 3/2006 | Ebert | |
| 2019/0199720 A1* | 6/2019 | Palli | G06Q 20/3227 |
| 2019/0266312 A1 | 8/2019 | Mintz | |
| 2020/0036797 A1* | 1/2020 | Kudelski | H04W 4/80 |

FOREIGN PATENT DOCUMENTS

| | | |
|---|---|---|
| WO | 2017153990 A1 | 9/2017 |
| WO | 2018125989 A1 | 7/2018 |

* cited by examiner

*Primary Examiner* — Michael T Vu
(74) *Attorney, Agent, or Firm* — Blueshift IP, LLC; Robert Plotkin

(57) ABSTRACT

A computer-implemented method only enables a software application to launch on a first device if a unique identifier of the first device is determined to be valid by a second device, and if a unique identifier stored in the software application matches a unique identifier of the software application stored on the first device.

20 Claims, 2 Drawing Sheets

COMPUTER SYSTEM AND METHOD FOR SOFTWARE AUTHENTICATION AND SINGLE APPLICATION ENFORCEMENT

BACKGROUND

Manufacturers of computing devices often desire to ensure that users of such devices only execute software that has been authorized by the manufacturer on such devices. In practice, however, users often may easily install and execute software of their choosing on such devices, despite the wishes of the device manufacturer to the contrary.

SUMMARY

One aspect of the present disclosure relates to a system. The system may include one or more hardware processors configured by machine-readable instructions. The processor(s) may be configured to, at a first device, transmit a unique device identifier of the first device over a telecommunications network to a second device. The processor(s) may be configured to, at the second device, determine whether the unique device identifier of the first device is valid. The processor(s) may be configured to, at the second device, if the unique identifier of the first device was determined to be valid, then transmit first application data over the telecommunications network to the first device, the first application data including first application program data including a first software application and first application ID data including a first unique identifier of the first software application. The processor(s) may be configured to, at the first device, if the unique identifier of the first device was determined to be valid, store the first application program data and the first application ID data on the first device. The processor(s) may be configured to, at the first device, if the unique identifier of the first device was determined to be valid, receive first input representing a first request to launch the first software application. The processor(s) may be configured to, at the first device, if the unique identifier of the first device was determined to be valid, determine whether a second unique identifier stored in the first software application is the same as the first unique identifier of the first software application stored on the first device. The processor(s) may be configured to, at the first device, if the unique identifier of the first device was determined to be valid and if the second unique identifier is determined to be the same as the first unique identifier, then launch the first software application on the first device. The processor(s) may be configured to, at the first device, if the unique identifier of the first device was determined to be valid and if the second unique identifier is not determined to be the same as the first unique identifier, not launch the first software application on the first device. The processor(s) may be configured to, at the second device, if the unique device identifier of the first device was not determined to be valid, not transmit the first application data to the first device.

In some implementations of the system, the processor(s) may be configured to, before transmitting the unique device identifier of the first device over the telecommunications network to the second device, generating the unique device identifier by hashing a plurality of values associated with the first device.

In some implementations of the system, the plurality of values may include one or more of the following: a MAC address of the first device, a manufacturer's serial number of the first device, and a serial number of a cryptography chip of the first device.

In some implementations of the system, the processor(s) may be configured to store the unique device identifier in any one or more of the following: the first device, the second device, and a third computing device.

In some implementations of the system, determining whether the unique device identifier of the first device may be valid includes determining whether the unique device identifier received from the first device is identical to a unique device identifier stored in association with the first device and determining that the unique device identifier of the first device is valid only if the unique device identifier received from the first device is determined to be identical to the unique device identifier stored in association with the first device.

In some implementations of the system, the processor(s) may be configured to, at the first device, prohibit a second software application from being stored on the first device unless and until the first software application is removed from the first device.

Another aspect of the present disclosure relates to a method. The method may include, at a first device, transmitting a unique device identifier of the first device over a telecommunications network to a second device. The method may include, at the second device, determining whether the unique device identifier of the first device is valid. The method may include, at the second device, if the unique identifier of the first device was determined to be valid, then transmitting first application data over the telecommunications network to the first device, the first application data including first application program data including a first software application and first application ID data including a first unique identifier of the first software application. The method may include, at the first device, if the unique identifier of the first device was determined to be valid, storing the first application program data and the first application ID data on any one or more of the following: the first device, the second device, and a third device. The method may include, at the first device, if the unique identifier of the first device was determined to be valid, receiving first input representing a first request to launch the first software application. The method may include, at the first device, if the unique identifier of the first device was determined to be valid, determining whether a second unique identifier stored in the first software application is the same as the first unique identifier of the first software application stored on the first device. The method may include, at the first device, if the unique identifier of the first device was determined to be valid and if the second unique identifier is determined to be the same as the first unique identifier, then launching the first software application on the first device. The method may include, at the first device, if the unique identifier of the first device was determined to be valid and if the second unique identifier is not determined to be the same as the first unique identifier, not launching the first software application on the first device. The method may include, at the second device, if the unique device identifier of the first device was not determined to be valid, not transmitting the first application data to the first device.

Yet another aspect of the present disclosure relates to a non-transient computer-readable storage medium having instructions embodied thereon, the instructions being executable by one or more processors to perform a method. The method may include, at a first device, transmitting a unique device identifier of the first device over a telecommunications network to a second device. The method may include, at the second device, determining whether the unique device identifier of the first device is valid. The method may include, at the second device, if the unique identifier of the first device was determined to be valid, then transmitting first application data over the telecommunications network to the first device, the first application data including first application program data including a first software application and first application ID data including a first unique identifier of the first software application. The method may include, at the first device, if the unique identifier of the first device was determined to be valid, storing the first application program data and the first application ID data on any one or more of the following: the first device, the second device, and a third device. The method may include, at the first device, if the unique identifier of the first device was determined to be valid, receiving first input representing a first request to launch the first software application. The method may include, at the first device, if the unique identifier of the first device was determined to be valid, determining whether a second unique identifier stored in the first software application is the same as the first unique identifier of the first software application stored on the first device. The method may include, at the first device, if the unique identifier of the first device was determined to be valid and if the second unique identifier is determined to be the same as the first unique identifier, then launching the first software application on the first device. The method may include, at the first device, if the unique identifier of the first device was determined to be valid and if the second unique identifier is not determined to be the same as the first unique identifier, not launching the first software application on the first device. The method may include, at the second device, if the unique device identifier of the first device was not determined to be valid, not transmitting the first application data to the first device.

Other features and advantages of various aspects and embodiments of the present invention will become apparent from the following description and from the claims.

DETAILED DESCRIPTION

Figure 1:
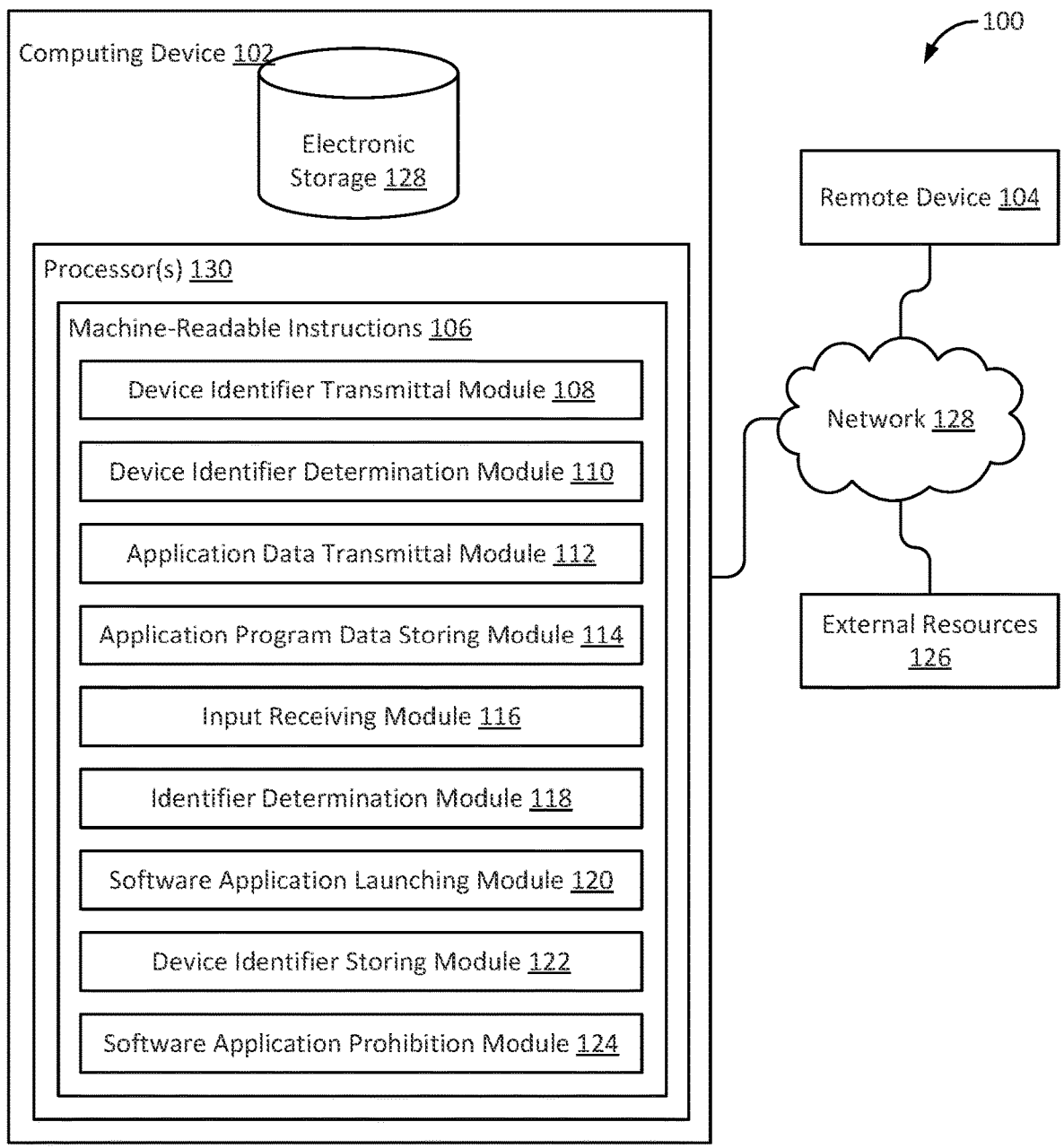
FIG. 1 illustrates a system configured to ensure that users of the system only install and execute software that has been authorized on a computing device within the system, in accordance with embodiments of the present invention.

FIG. 1 illustrates a system 100 configured to ensure that users of the system only install and execute software that has been authorized on a computing device 102 within the system 100, in accordance with embodiments of the present invention. The system 100 of FIG. 1 may also ensure that at most one software application is installed and executing on computing devices (e.g., computing device 102) within the system 100 at any particular time.

In some embodiments of the present invention, system 100 may include one or more computing devices 102. Although only a single computing device 102 is shown in FIG. 1 for ease of illustration, it should be understood that the system 100 may include a plurality of computing devices, each of which may be implemented in any of the ways disclosed herein in connection with FIG. 1. Computing device 102 may be configured to communicate with one or more remote devices 104 according to a client/server architecture, a peer-to-peer architecture, and/or other architectures. Although only a single remote device 104 is shown in FIG. 1 for ease of illustration, it should be understood that the system 100 may include a plurality of remote devices, each of which may be implemented in any of the ways disclosed herein in connection with FIG. 1. Remote device 104 may be configured to communicate with other remote devices via computing device 102 and/or according to a client/server architecture, a peer-to-peer architecture, and/or other architectures.

Computing device 102 may be configured by machine-readable instructions 106. Machine-readable instructions 106 may include one or more instruction modules. The instruction modules may include computer program modules. For example, the instruction modules may include one or more of device identifier transmittal module 108, device identifier determination module 110, application data transmittal module 112, application program data storing module 114, input receiving module 116, identifier determination module 118, software application launching module 120, device identifier storing module 122, software application prohibition module 124, and/or other instruction modules. The various modules of the machine-readable instructions 106 will be described in more detail herein. Although the machine-readable instructions 106 are illustrated in FIG. 1 as being solely contained within the computing device 102, in practice some of the machine-readable instructions 106 may be contained within the computing device 102 and some of the machine-readable instructions 106 may be contained within the remote device 104. For example, modules within the machine-readable instructions 106 that are described herein as being executed by the computing device 102 may be contained within the computing device 102 (and not within the remote device 104), while modules within the machine-readable instructions 106 that are described herein as being executed by the remote device 104 may be contained within the remote device 104 (and not within the computing device 102). Other ways of distributing and implementing the machine-readable instructions 106 on the computing device 102 and the remote device 104 will be apparent to those having ordinary skill in the art.

Device identifier transmittal module 108 may be configured to, at the computing device 102 (which is an example of a "first device," as that term is used herein), transmit a unique device identifier of the computing device 102 over a telecommunications network 128 (such as the public Internet, a private internet, an intranet, or any other network) to the remote device 104 (which is an example of a "second device," as that term is used herein).

Application data transmittal module 112 may be configured to, at the remote device 104, if the unique identifier of the computing device 102 was determined to be valid, then transmitting first application data over the telecommunications network 128 to the computing device 102, the first application data including first application program data including a first software application and first application ID data including a first unique identifier of the first software application.

Application program data storing module 114 may be configured to, at the computing device 102, if the unique identifier of the computing device 102 was determined to be valid, store the first application program data and the first application ID data on any one or more of the following: the computing device 102, the remote device 104, and a third device (not shown, such as a server accessible over the network 128).

Input receiving module 116 may be configured to, at the computing device 102, if the unique identifier of the computing device 102 was determined to be valid, receive first input representing a first request to launch the first software application.

Identifier determination module 118 may be configured to, at the computing device 102, if the unique identifier of the computing device 102 was determined to be valid, determine whether a second unique identifier stored in the first software application is the same as the first unique identifier of the first software application stored on the computing device 102.

Software application launching module 120 may be configured to, at the computing device 102, if the unique identifier of the computing device 102 was determined to be valid and if the second unique identifier is determined to be the same as the first unique identifier, then launch the first software application on the computing device 102.

Software application launching module 120 may be configured to, at the computing device 102, if the unique identifier of the computing device was determined to be valid and if the second unique identifier is not determined to be the same as the first unique identifier, not launch the first software application on the computing device 102.

Application data transmittal module 112 may be configured to, at the remote device 104, if the unique device identifier of the computing device 102 was not determined to be valid, not transmit the first application data to the computing device 102.

Device identifier transmittal module 108 may be configured to, before transmitting the unique device identifier of the computing device 102 over the telecommunications network 128 to the remote device 104, generate the unique device identifier based on a plurality of values associated with the computing device 102, such as by hashing the plurality of values associated with the computing device 102 to generate the unique device identifier. The plurality of values may include one or more of the following: a MAC address of the computing device 102, a manufacturer's serial number of the computing device 102, and a serial number of a cryptography chip of the computing device 102.

Device identifier storing module 122 may be configured to store the unique device identifier in any one or more of the following: the computing device 102, the remote device 104, and a third device (not shown, such as a server accessible over the network 128).

Device identifier determination module 110 may be configured to, at the remote device 104, determine whether the unique device identifier of the computing device 102 is valid. Determining whether the unique device identifier of the computing device 102 is valid may include, for example, determining whether the unique device identifier received from the computing device 102 is identical to a unique device identifier stored (e.g., at the remote device 104) in association with the computing device 102, and determining that the unique device identifier of the computing device 102 is valid only if the unique device identifier received from the computing device 102 is determined to be identical to the unique device identifier stored in association with the computing device 102.

Software application prohibition module 124 may be configured to, at the computing device 102, prohibit a second software application from being stored on the computing device 102 unless and until the first software application is removed from the computing device 102. Prohibiting the second software application from being stored on the computing device 102 unless and until the first software application is removed from the computing device 102 may include, for example, any one or more of the following, in any combination:

receiving second input representing a second request to store the second software application on the computing device 102;
  determining that the first software application is stored on the computing device 102; and
  in response to determining that the first software application is stored on the computing device, not storing the second software application on the computing device.

Prohibiting the second software application from being stored on the computing device 102 unless and until the first software application is removed from the computing device 102 may include, for example, any one or more of the following, in any combination:

receiving second input representing a second request to store the second software application on the computing device 102;
  determining that the first software application is stored on the computing device 102; and
  in response to determining that the first software application is stored on the computing device 102:
    removing the first software application from the computing device 102; and,
    after removing the first software application from the computing device 102, storing the second software application on the computing device 102.

Software application prohibition module 124 may be configured to, at the computing device 102, prohibit a second software application from executing on the computing device 102 unless and until the first software application is removed from the computing device 102.

In some embodiments of the present invention, computing device 102, remote device 104, and/or external resources 126 may be operatively linked via one or more electronic communication links. For example, such electronic communication links may be established, at least in part, via a network 128 such as the Internet and/or other networks. It will be appreciated that this is not intended to be limiting, and that the scope of this disclosure includes implementations in which computing device 102, remote device 104, and/or external resources 126 may be operatively linked via some other communication media.

A given remote device 104 may include one or more processors configured to execute computer program modules. The computer program modules may be configured to enable an expert or user associated with the given remote device 104 to interface with system 100 and/or external resources 126, and/or provide other functionality attributed herein to remote device 104. By way of non-limiting example, a given remote device 104 and/or a given computing device 102 may include one or more of a server, a desktop computer, a laptop computer, a handheld computer, a tablet computing platform, a Netbook, a Smartphone, a gaming console, and/or other computing platforms.

External resources 126 may include sources of information outside of system 100, external entities participating with system 100, and/or other resources. In some embodiments of the present invention, some or all of the functionality attributed herein to external resources 126 may be provided by resources included in system 100.

Computing device 102 may include electronic storage 128, one or more processors 130, and/or other components. Computing device 102 may include communication lines, or ports to enable the exchange of information with a network and/or other computing platforms. Illustration of computing device 102 in FIG. 1 is not intended to be limiting. Computing device 102 may include a plurality of hardware, software, and/or firmware components operating together to provide the functionality attributed herein to computing device 102. For example, computing device 102 may be implemented by a cloud of computing platforms operating together as computing device 102.

Electronic storage 128 may comprise non-transitory storage media that electronically stores information. The electronic storage media of electronic storage 128 may include one or both of system storage that is provided integrally (i.e., substantially non-removable) with computing device 102 and/or removable storage that is removably connectable to computing device 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from computing device 102, information received from remote device 104, and/or other information that enables computing device 102 to function as described herein.

Processor(s) 130 may be configured to provide information processing capabilities in computing device 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some embodiments of the present invention, processor(s) 130 may include a plurality of processing units. These processing units may be physically located within the same device, or processor(s) 130 may represent processing functionality of a plurality of devices operating in coordination. Processor(s) 130 may be configured to execute modules 108, 110, 112, 114, 116, 118, 120, 122, and/or 124, and/or other modules. Processor(s) 130 may be configured to execute modules 108, 110, 112, 114, 116, 118, 120, 122, and/or 124, and/or other modules by software; hardware; firmware; some combination of software, hardware, and/or firmware; and/or other mechanisms for configuring processing capabilities on processor(s) 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, and/or 124 are illustrated in FIG. 1 as being implemented within a single processing unit, in implementations in which processor(s) 130 includes multiple processing units, one or more of modules 108, 110, 112, 114, 116, 118, 120, 122, and/or 124 may be implemented remotely from the other modules. The description of the functionality provided by the different modules 108, 110, 112, 114, 116, 118, 120, 122, and/or 124 described below is for illustrative purposes, and is not intended to be limiting, as any of modules 108, 110, 112, 114, 116, 118, 120, 122, and/or 124 may provide more or less functionality than is described. For example, one or more of modules 108, 110, 112, 114, 116, 118, 120, 122, and/or 124 may be eliminated, and some or all of its functionality may be provided by other ones of modules 108, 110, 112, 114, 116, 118, 120, 122, and/or 124. As another example, processor(s) 130 may be configured to execute one or more additional modules that may perform some or all of the functionality attributed below to one of modules 108, 110, 112, 114, 116, 118, 120, 122, and/or 124.

Figure 2:
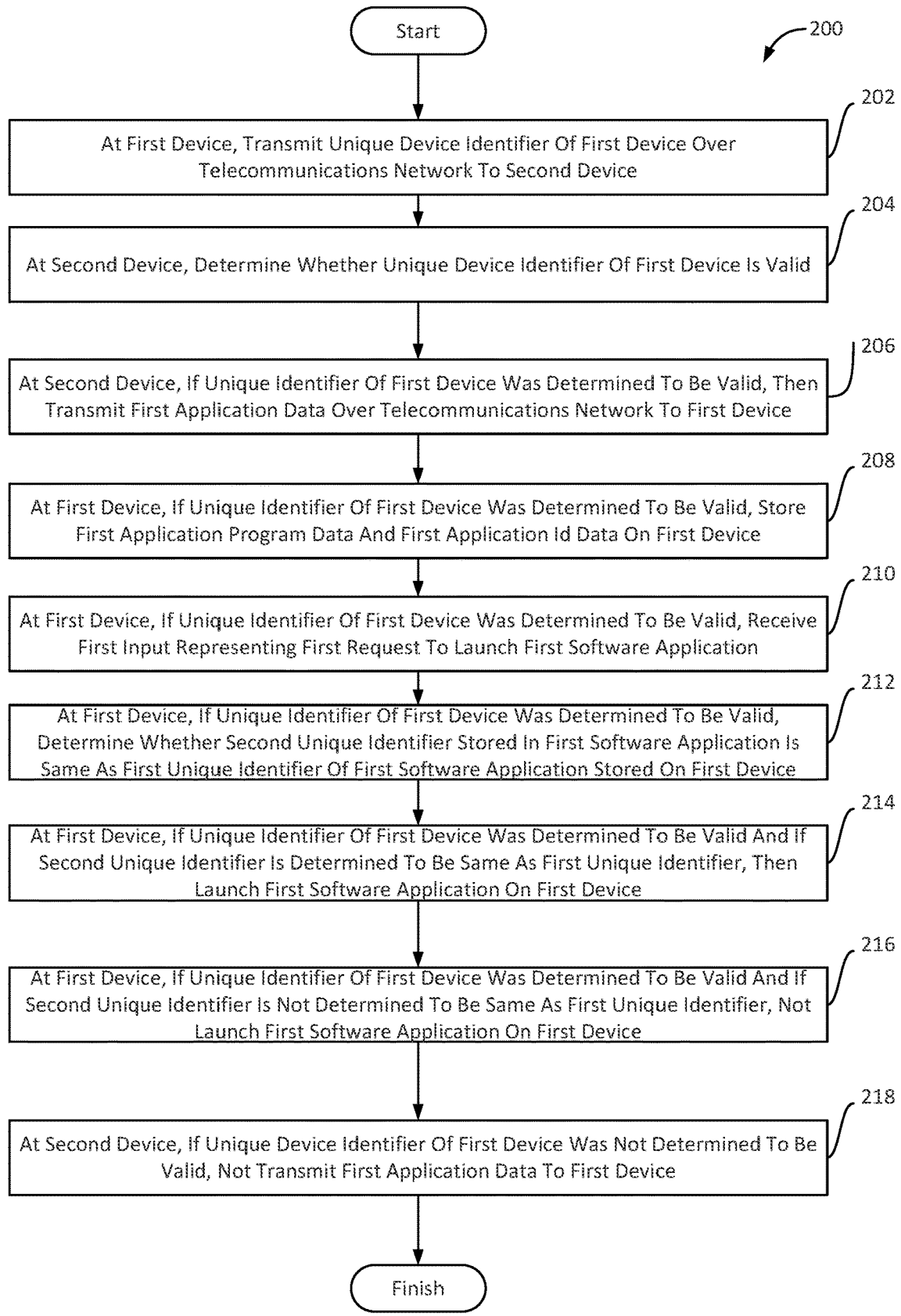
FIG. 2 illustrates a method that is performed by the system of FIG. 1 according to embodiments of the present invention.

FIG. 2 illustrates a method 200 performed by the system 100 of FIG. 1 according to embodiments of the present invention. The operations of method 200 presented below are intended to be illustrative. In some embodiments of the present invention, method 200 may be accomplished with one or more additional operations not described, and/or without one or more of the operations discussed. Additionally, the order in which the operations of method 200 are illustrated in FIG. 2 and described below is not intended to be limiting.

In some embodiments of the present invention, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2 illustrates method 200, in accordance with embodiments of the present invention.

An operation 202 may include at the computing device 102 (also referred to herein as a "first device"), transmitting a unique device identifier of the computing device 102 over the telecommunications network 128 to the remote device 104 (also referred to herein as a "second device"). Operation 202 may be performed by one or more hardware processors configured by machine-readable instructions including a module that is the same as or similar to device identifier transmittal module 108, in accordance with embodiments of the present invention.

An operation 204 may include at the remote device 104, determining whether the unique device identifier of the computing device 102 is valid. Operation 204 may be performed by one or more hardware processors configured by machine-readable instructions including a module that is the same as or similar to device identifier determination module 110, in accordance with embodiments of the present invention.

An operation 206 may include at the remote device 104, if the unique identifier of the computing device 102 was determined to be valid, then transmitting first application data over the telecommunications network 128 to the computing device 102, the first application data including first application program data including a first software application and first application ID data including a first unique identifier of the first software application. Operation 206 may be performed by one or more hardware processors configured by machine-readable instructions including a module that is the same as or similar to application data transmittal module 112, in accordance with embodiments of the present invention.

An operation 208 may include at the computing device 102, if the unique identifier of the computing device 102 was determined to be valid, storing the first application program data and the first application ID data on the computing device 102. Operation 208 may be performed by one or more hardware processors configured by machine-readable instructions including a module that is the same as or similar to application program data storing module 114, in accordance with embodiments of the present invention.

An operation 210 may include at the computing device 102, if the unique identifier of the computing device 102 was determined to be valid, receiving first input representing a first request to launch the first software application. Operation 210 may be performed by one or more hardware processors configured by machine-readable instructions including a module that is the same as or similar to input receiving module 116, in accordance with embodiments of the present invention.

An operation 212 may include at the computing device 102, if the unique identifier of the computing device 102 was determined to be valid, determining whether a second unique identifier stored in the first software application is the same as the first unique identifier of the first software application stored on the computing device 102. Operation 212 may be performed by one or more hardware processors configured by machine-readable instructions including a module that is the same as or similar to identifier determination module 118, in accordance with embodiments of the present invention.

An operation 214 may include at the computing device 102, if the unique identifier of the computing device 102 was determined to be valid and if the second unique identifier is determined to be the same as the first unique identifier, then launching the first software application on the computing device 102. Operation 214 may be performed by one or more hardware processors configured by machine-readable instructions including a module that is the same as or similar to software application launching module 120, in accordance with embodiments of the present invention.

An operation 216 may include at the computing device, if the unique identifier of the first device was determined to be valid and if the second unique identifier is not determined to be the same as the first unique identifier, not launching the first software application on the computing device 102. Operation 216 may be performed by one or more hardware processors configured by machine-readable instructions including a module that is the same as or similar to software application launching module 120, in accordance with embodiments of the present invention.

An operation 218 may include at the remote device, if the unique device identifier of the first device was not determined to be valid, not transmitting the first application data to the computing device 102. Operation 218 may be performed by one or more hardware processors configured by machine-readable instructions including a module that is the same as or similar to application data transmittal module 112, in accordance with embodiments of the present invention.

Although not shown in FIG. 2, the method 200 may include further operations and/or refinements, such as, but not limited to, any one or more of the following, in any combination:

The method 200 may include, before transmitting the unique device identifier of the computing device 102 over the telecommunications network to the second device, generating the unique device identifier by hashing a plurality of values associated with the first device.

The method 200 may include storing the unique device identifier in the computing device 102.

The method 200 may include, at the computing device 102, prohibiting a second software application from being stored on the computing device 102 unless and until the first software application is removed from the computing device 102.

The method 200 may include, at the computing device 102, prohibiting a second software application from executing on the computing device 102 unless and until the first software application is removed from the computing device.

Having described certain embodiments of the present invention at a high level, certain embodiments of the present invention will now be described in more detail. The computing device 102 may be any kind of device, such as a controller. The unique device identifier of the computing device 102 may take any of a variety of forms and be generated in any of a variety of ways. For example, embodiments of the present invention may generate the unique device identifier of the computing device 102 by hashing one or more of the following to produce a hash that is used as the unique device identifier (or part of the unique device identifier): a serial number of the computing device 102, a network address (e.g., MAC address) of the computing device 102, and a serial number of a cryptography chip (not shown) in the computing device 102. Embodiments of the present invention may store the unique device identifier of the computing device 102 locally (e.g., in the computing device 102), remotely (e.g., in or in a location accessible to the remote device 104), or both. For example, the computing device 102 may store the unique device identifier of the computing device 102 in the computing device 102 and transmit the unique device identifier of the computing device 102 over the network 128 to the remote computing device 104, which may store the unique device identifier of the computing device 102 in the remote device 104 or in storage that is accessible to the remote device 104.

A user of the computing device 102 may, for example, create an account associated with the user. For example, the user may create an account associated with particular login credentials (e.g., username and password) at a server (e.g., the remote device 104) that is remote from (e.g., accessible over the network 128 by) the computing device 102.

The computing device 102 may retrieve its unique device identifier (e.g., from storage in the computing device 102) and transmit the unique device identifier over the network 128 to the remote device 104. The remote device 104 may determine whether the computing device 102 is authorized, such as by determining whether the unique device identifier received from the computing device 102 is valid. The remote device 104 may determine whether the unique device identifier is valid in any of a variety of ways, such as by comparing the unique device identifier received from the computing device 102 to the unique device identifier stored by the remote device 104 in association with the computing device 102, and determining whether the two unique identifiers are identical or otherwise equivalent to each other. The remote device 104 may determine that the computing device 102 is authorized (and that the unique device identifier received from the computing device 102 is valid) if the two unique device identifiers are determined to be identical or otherwise equivalent to each other, and otherwise determine that the computing device 102 is not authorized (and that the unique device identifier received from the computing device 102 is not valid).

A user of the computing device 102 may attempt to initiate a purchase or other download of a first software application from the remote device 104, such as from within the user account to which the user is logged in. As part of this process, the user may provide some input to the computing device 102 representing a request to purchase or download the first software application. Similarly, the computing device 102 may transmit, to the remote device 104 other than the network 128, data representing a request to purchase or download the first software application. The remote device 104 may grant the request (e.g., permit the purchase and/or transmit the first software application over the network 128 to the computing device 102) if the two unique device identifiers were previously determined to be identical or otherwise equivalent to each other, and deny the request otherwise.

If the remote device 104 determines that the two unique device identifiers are identical or otherwise equivalent to each other, then the remote device 104 may transmit, over the network 128 to the computing device 102, first application data including: (1) first application program data including the first software application; and (2) first application identifier (ID) data including a first unique identifier of the first software application. Note that the first application program data may include the first application ID data. The computing device 102 may store locally (e.g., on the computing device 102) the first application program data and the first application ID data.

The computing device 102 may receive, from a user, a request to launch a particular software application that is installed on the computing device 102. In response to such a request, the computing device 102 may determine whether a unique application identifier of the requested software application is identical or otherwise equivalent to the unique application identifier that was previously stored in the computing device 102, in the process described above. If the two application identifiers are determined to be identical or otherwise equivalent to each other, then the computing device 102 grants the request and launches the requested software application. Otherwise, the computing device 102 denies the request and does not launch the requested software application.

Furthermore, embodiments of the present invention may prevent more than one software application from being installed on and executed on the computing device 102 at a time. Embodiments of the present invention may perform these functions in any of a variety of ways. For example, if a user provides input to the computing device 102 representing a request to download a software application to the computing device 102 and/or to install a software application to the computing device 102, in response to such a request the computing device 102 may determine whether a software application is already installed on the computing device 102. If the computing device 102 determines that no software application is installed on the computing device 102 (other than an operating system and any software required to perform the functions disclosed in FIGS. 1 and 2), then the computing device 102 may, in response to such a determination, grant the request to download and/or install the requested software application on the computing device 102, and the requested software application may in fact be downloaded to and/or installed on the computing device 102. In contrast, if the computing device determines that a software application is already installed on the computing device (other than an operating system and any software required to perform the functions disclosed in FIGS. 1 and 2), then the computing device may either: (1) deny the request, such as by prohibiting the requested software application from being downloaded to and/or installed on the computing device 102; or (2) remove (e.g., uninstall) the installed software application from the computing device 102 and, after removing the installed software application from the computing device 102, download the requested software application to the computing device 102 and store (e.g., install) the requested software application on the computing device 102.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may automatically determine whether or not to launch a software application on a computer, and then launch or not launch the software application based on the determination. These are acts which are inherent to computer technology and cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by a computer, the computer comprising at least one computer processor and at least one non-transitory computer-readable medium containing computer program instructions which, when executed by the at least one computer processor, perform the method, the method comprising:
    (A) at a first device, transmitting a unique device identifier of the first device over a telecommunications network to a second device;
    (B) at the second device, determining whether the unique device identifier of the first device is valid;
    (C) at the second device, if the unique identifier of the first device was determined to be valid, then:
        (C)(1) at the second device, transmitting first application data over the telecommunications network to the first device, the first application data including:
            first application program data comprising a first software application; and
            first application ID data comprising a first unique identifier of the first software application;
        (C)(2) at the first device, storing the first application program data and the first application ID data on the first device;
        (C)(3) at the first device, receiving first input representing a first request to launch the first software application;
        (C)(4) at the first device, determining whether a second unique identifier stored in the first software application is the same as the first unique identifier of the first software application stored on the first device;
        (C)(5) at the first device, if the second unique identifier is determined to be the same as the first unique identifier, then launching the first software application on the first device;
        (C)(6) at the first device, if the second unique identifier is not determined to be the same as the first unique identifier, then not launching the first software application on the first device;
    (D) at the second device, if the unique device identifier of the first device was not determined to be valid, then not transmitting the first application data to the first device.

2. The method of claim 1, further comprising:
    (E) before (A), generating the unique device identifier by hashing a plurality of values associated with the first device.

3. The method of claim 2, wherein the plurality of values includes a MAC address of the first device.

4. The method of claim 2, wherein the plurality of values includes a serial number of the first device.

5. The method of claim 2, further comprising:
    (F) storing the unique device identifier in the first device.

6. The method of claim 1, wherein (B) comprises determining whether the unique device identifier received from the first device is identical to a unique device identifier stored in association with the first device, and determining that the unique device identifier of the first device is valid only if the unique device identifier received from the first device is determined to be identical to the unique device identifier stored in association with the first device.

7. The method of claim 1, further comprising:
(E) at the first device, prohibiting a second software application from being stored on the first device unless and until the first software application is removed from the first device.

8. The method of claim 7, wherein (E) comprises:
receiving second input representing a second request to store the second software application on the first device;
determining that the first software application is stored on the first device; and
in response to determining that the first software application is stored on the first device, not storing the second software application on the first device.

9. The method of claim 7, wherein (E) comprises:
receiving second input representing a second request to store the second software application on the first device;
determining that the first software application is stored on the first device; and
in response to determining that the first software application is stored on the first device:
removing the first software application from the first device; and
after removing the first software application from the first device, storing the second software application on the first device.

10. The method of claim 1, further comprising:
(E) at the first device, prohibiting a second software application from executing on the first device unless and until the first software application is removed from the first device.

11. A system comprising at least non-transitory computer-readable medium containing computer program instructions which, when executed by at least one computer processor, perform a method, the method comprising:
(A) at a first device, transmitting a unique device identifier of the first device over a telecommunications network to a second device;
(B) at the second device, determining whether the unique device identifier of the first device is valid;
(C) at the second device, if the unique identifier of the first device was determined to be valid, then:
(C)(1) at the second device, transmitting first application data over the telecommunications network to the first device, the first application data including:
first application program data comprising a first software application; and
first application ID data comprising a first unique identifier of the first software application;
(C)(2) at the first device, storing the first application program data and the first application ID data on the first device;
(C)(3) at the first device, receiving first input representing a first request to launch the first software application;
(C)(4) at the first device, determining whether a second unique identifier stored in the first software application is the same as the first unique identifier of the first software application stored on the first device;
(C)(5) at the first device, if the second unique identifier is determined to be the same as the first unique identifier, then launching the first software application on the first device;
(C)(6) at the first device, if the second unique identifier is not determined to be the same as the first unique identifier, then not launching the first software application on the first device;
(D) at the second device, if the unique device identifier of the first device was not determined to be valid, then not transmitting the first application data to the first device.

12. The system of claim 11, wherein the method further comprises:
(E) before (A), generating the unique device identifier by hashing a plurality of values associated with the first device.

13. The system of claim 12, wherein the plurality of values includes a MAC address of the first device.

14. The system of claim 12, wherein the plurality of values includes a serial number of the first device.

15. The system of claim 12, wherein the method further comprises:
(F) storing the unique device identifier in the first device.

16. The system of claim 11, wherein (B) comprises determining whether the unique device identifier received from the first device is identical to a unique device identifier stored in association with the first device, and determining that the unique device identifier of the first device is valid only if the unique device identifier received from the first device is determined to be identical to the unique device identifier stored in association with the first device.

17. The system of claim 11, wherein the method further comprises:
(E) at the first device, prohibiting a second software application from being stored on the first device unless and until the first software application is removed from the first device.

18. The system of claim 17, wherein (E) comprises: receiving second input representing a second request to store the second software application on the first device; determining that the first software application is stored on the first device; and in response to determining that the first software application is stored on the first device, not storing the second software application on the first device.

19. The system of claim 17, wherein (E) comprises: receiving second input representing a second request to store the second software application on the first device; determining that the first software application is stored on the first device; and in response to determining that the first software application is stored on the first device: removing the first software application from the first device; and after removing the first software application from the first device, storing the second software application on the first device.

20. The system of claim 11, wherein the method further comprises: (E) at the first device, prohibiting a second software application from executing on the first device unless and until the first software application is removed from the first device.

* * * * *